United States Patent

[11] 3,600,768

[72] Inventors Louis Romanzi, Jr.
Brighton Township;
William J. Eubank, Livonia, both of, Mich.
[21] Appl. No. 802,557
[22] Filed Feb. 26, 1969
[45] Patented Aug. 24, 1971
[73] Assignee Irvin Industries Inc.
Lexington, Ky.

[54] INTEGRAL THREE-POINT SAFETY BUCKLE
12 Claims, 17 Drawing Figs.
[52] U.S. Cl. .................................................. 24/205.17,
24/230 AK, 24/230 AM, 24/211 K, 297/388,
297/389
[51] Int. Cl. ................................................... A44b 17/00
[50] Field of Search ........................................... 297/388,
389; 24/205.17, 205.19, 211 K, 230.1 M, 230.1 K,
222

[56] References Cited
UNITED STATES PATENTS
| | | | |
|---|---|---|---|
| 2,899,732 | 8/1959 | Cushman ...................... | 24/205.17 |
| 3,106,004 | 10/1963 | Davis ............................ | 24/205.17 |
| 3,351,382 | 11/1967 | Davies .......................... | 297/389 |
| 3,364,532 | 1/1968 | Hatfield ........................ | 24/230.1 M |
| 3,456,981 | 7/1969 | Radke .......................... | 297/389 |

*Primary Examiner*—James C. Mitchell
*Attorney*—Rommel & Rommel

ABSTRACT: A safety belt and buckle construction for vehicles in which lap belt straps or webbing are provided as well as shoulder strap means, both the lap webbing and shoulder webbing being attached to the vehicle and remote therefrom all being connected by buckle means having a plurality of detents to respectively hold the lap belt straps and shoulder strap means in releasable latched position whereby all of the straps may be simultaneously released by a single pushbutton means or the shoulder strap released without releasing the lap straps.

Patented Aug. 24, 1971

INVENTORS.
Louis Romanzi, Jr.
William J. Eubank.
BY
ATTORNEYS

Patented Aug. 24, 1971

INVENTORS.
Louis Romanzi, Jr.
William J. Eubank.

BY Rommel & Rommel

ATTORNEYS

Patented Aug. 24, 1971

INVENTORS.
Louis Romanzi, Jr.
William J. Eubank.

BY *Rommel & Rommel*

ATTORNEYS

Patented Aug. 24, 1971

INVENTORS.
Louis Romanzi, Jr.
William J. Eubank.
BY Rommel and Rommel
ATTORNEYS

INTEGRAL THREE-POINT SAFETY BUCKLE

The present invention relates to lap or webbing couplings suitable for use in connection with vehicle safety belts including lap strap webbing and shoulder strap webbing, both of which are vehicle attached and are provided with an easily operated buckle construction which can be operated to simultaneously release all of the lap and shoulder webbing straps.

A further object of this invention is the provision of am improved buckle construction particularly well adapted for use in connection with safety belts which includes a plurality of latching means for respective releasable connection to lap and shoulder webbing and which detent means may be actuated to simultaneously release all of the lap and shoulder straps. The construction is such that the shoulder strap can be independently released while the lap straps are still connected to the buckle.

A further object of this invention is the provision of an improved buckle construction primarily adapted for use in connection with vehicle safety webbings or straps including a plurality of releasable latching means for different straps or webs with a single operating pushbutton construction having a cam action upon the latching means for the purpose of enabling a simultaneous release of all straps from the buckle construction.

Other objects and advantages of this invention will be apparent during the course of the following detailed description.

In the accompanying drawings, forming a part of this specification, and wherein for the purpose of illustration is shown but a preferred embodiment of the invention and wherein similar reference characters designate like parts of the invention:

FIG. 1 is a view of a part of a vehicle in section having a seat attached to the frame thereof and provided with the improved lap straps or webs and a shoulder strap, and a single buckle means having a plurality of detents operable to releasably connect all of the webs to the buckle frame and having a single push buckle means to simultaneously release the straps or webs from the buckle. In this form of invention the shoulder strap and one of the lap straps are provided with length adjusting means directly at the buckle construction and the outer ends of all straps are fixedly connected to the car frame.

Figure 9:
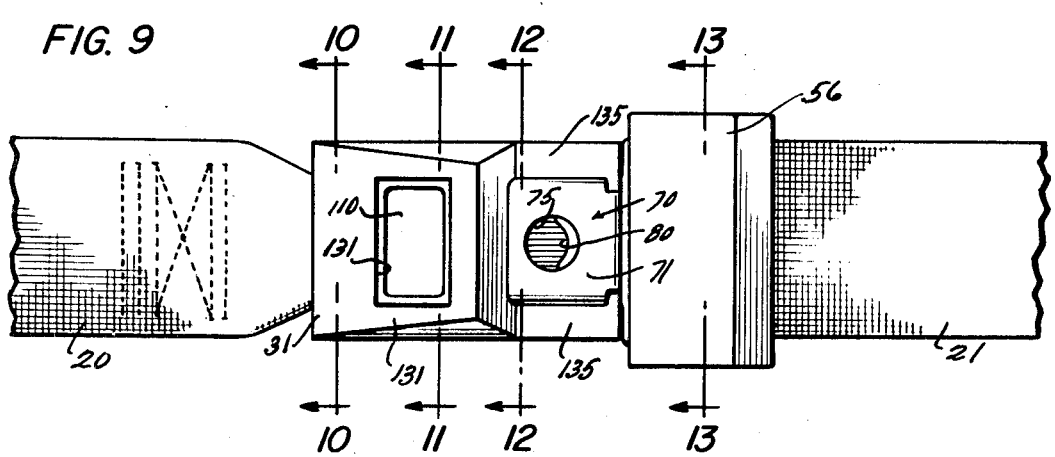
FIG. 9 is a view of the buckle parts similar to that shown in FIG. 2, but with the shoulder strap webbing released.
Figure 10:
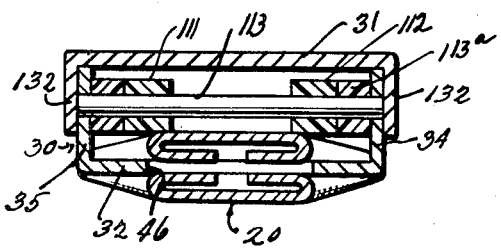
Figure 11:
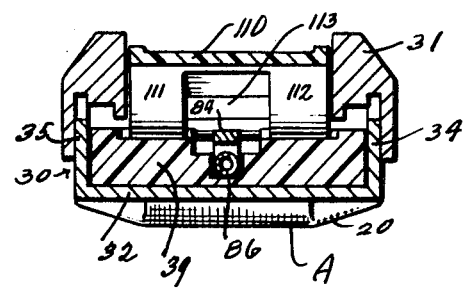
Figure 12:
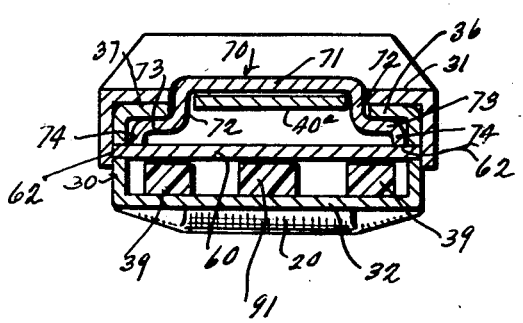
Figure 13:
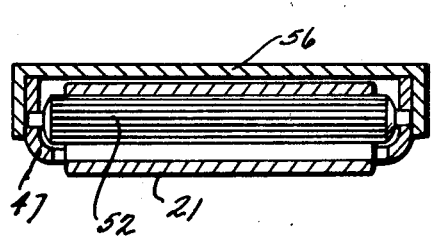

FIGS. 10, 11, 12 and 13 are cross-sectional views taken from the buckle construction shown in FIG. 9 substantially on the respective lines 10—10, 11—11, 12—12, and 13—13.

Figure 14:
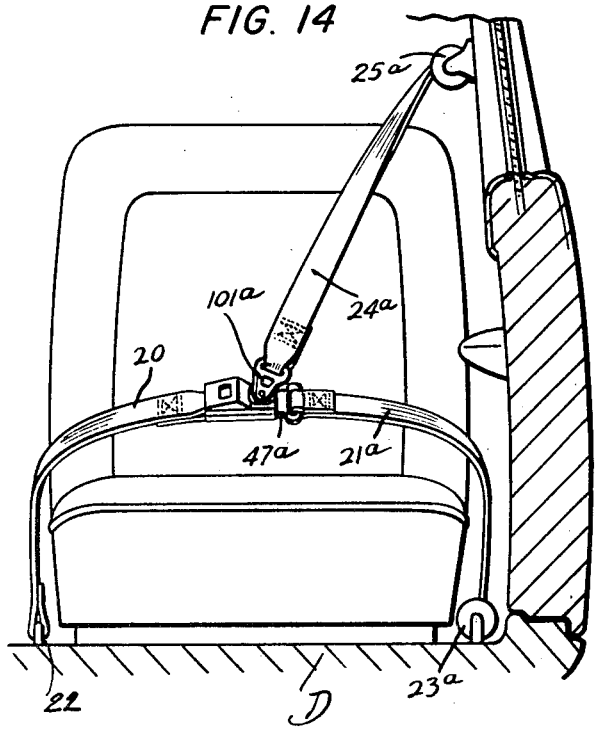

Fig. 14 shows an arrangement in which load-bearing or self-locking retractors are provided at the outer ends of the shoulder strap and the left lap strap. In this arrangement the buckle ends of these straps are fixedly attached to their respective buckle tongue.

Figure 15:
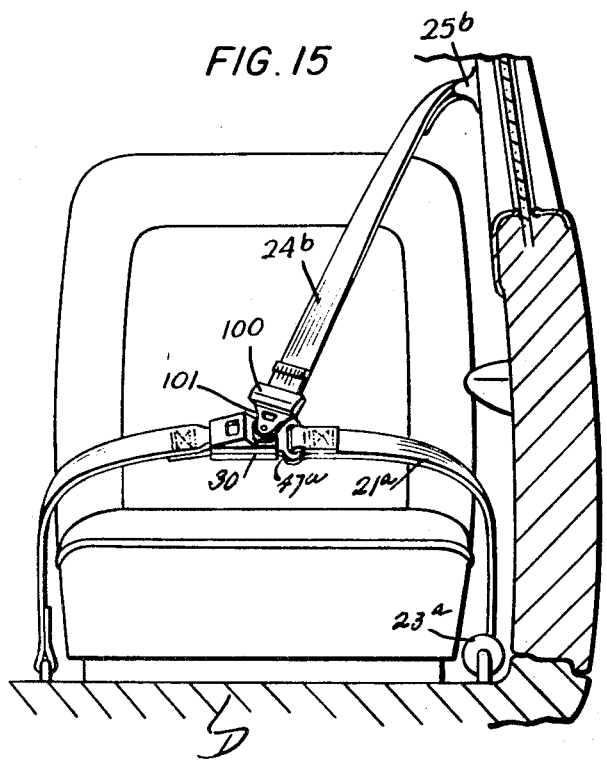

FIG. 15 is a view of the strap and buckle assemblage in which the shoulder strap at its outer end is provided with a fixed connection to the car frame or seat and the outer end of the end left lap strap is connected to a load bearing or self-locking retractor.

Figure 4:
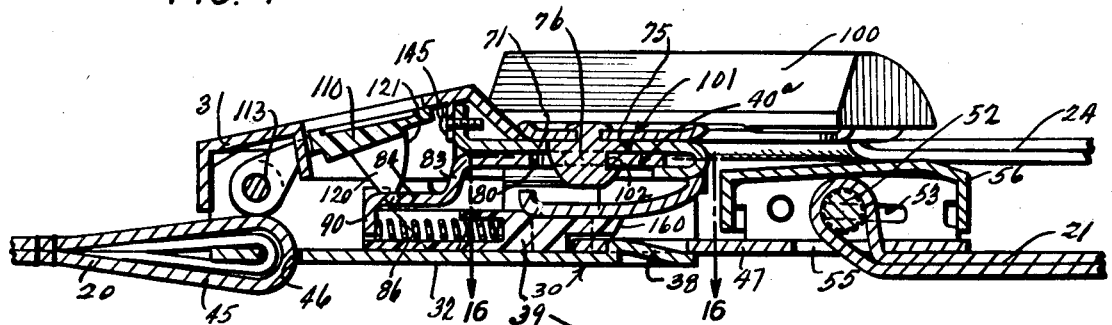
FIG. 4 is a vertical cross-sectional view taken through the buckle construction showing the different webs or straps attached therewith, the view being taken substantially on the line 4—4 of FIG. 2.
Figure 16:
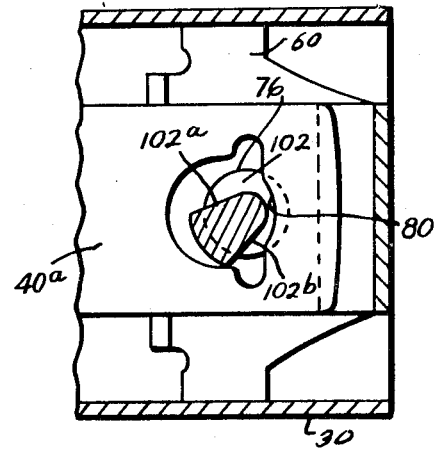

FIG. 16 is a view taken substantially on the lines 16—16 of FIG. 4, showing the locked position of the shoulder strap lug or projection upon the buckle latching dog, and showing how this projection is shaped to provide a cam.

Figure 17:
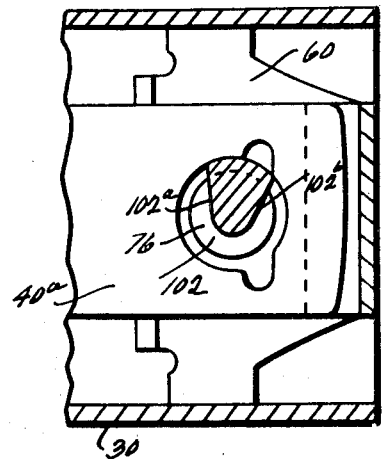

FIG. 17 is a view of the parts shown in FIG. 16, but with the locking lug or projection turned to move the latching dog and permit release of the shoulder strap from the buckle, as for instance, when it is desired not to open the lap straps but to release the shoulder strap from the buckle for the purpose of the seat occupant leaning forward such as to open the glove compartment.

This strap or webbing construction is adapted for vehicles of all types which include a frame D and seats E. It includes lap strap assembly A, shoulder strap assembly B and a combination buckle construction. C.

The lap strap or webbing construction usually includes right and left flexible straps or webs 20 and 21, of nylon or other strong flexible fabric material. The lap webbing 20 and 21 are attached in a conventional fixed manner to the car frame D at 22 and 23 respectively and at opposite ends they are releasably connected together by the combination buckle construction C.

The shoulder strap assemblage B may consist of one or more straps or webs 24 fixedly secured at the outer end or ends to the car frame D or seat E, as at 25, and their opposite end or ends may be secured releaseably and adjustably to the buckle assemblage C.

Generally the combination buckle assemblage C has a plurality of latching means intended to releasably connect both the lap and shoulder straps or webs together. This latching means is intended to be manually actuated by a release, such as a depressible pushbutton, whereby the different latching means may be simultaneously actuated to release both lap and shoulder webs or straps.

The combination buckle assemblage C generally includes a strong casing construction 30, preferably of metal, which hAS a removable light weight cover 31, generally of plastic, which frictionally or other wise is attached to the casing 30.

The casing 30 includes a baseplate 32 of generally flat rectangular At its at this opposite side edges are provided walls 34 and 35 in right angled relation thereto. The walls 34 and 35 at their fore ends are provided with overhanging metal retaining flanges 36 and 37, the purpose of which will be subsequently described.

Figure 5:
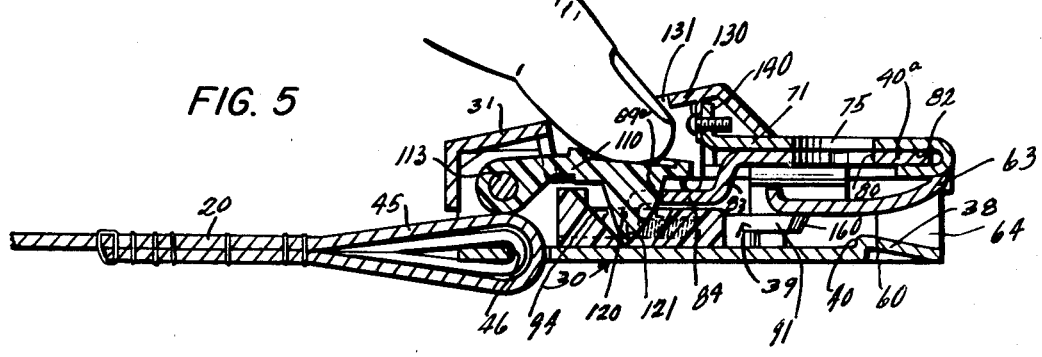
FIG. 5 is a cross-sectional view of the buckle construction shown in FIG. 4 showing an operator actuating the pushbutton for release of the detents or latches holding the different webs or straps.

On the fore end of the base 32, within the chamber 33 of the casing is centrally disposed a latching dog, projecting upwardly therefrom, which is shown in FIGS. 4 and 5. It slopes upwardly and rearwardly and at its rear end is provided with a latching shoulder 40. The latching construction for the lap straps or webs 20 and 21 includes a slidable latch member or blocker 39 slidable fore and aft upon the inside surface of the base wall 32. The shoulder webbing or strap has a latching means 40$^a$ which is also slidably mounted in the casing upon means to be subsequently described. These latching members 39 and 40$^a$ operate in opposite directions for latching and releasing the lap and shoulder webbing. Both the latch member or blocker 39 and the latching member or dog 40$^a$ are actuated to release positions by a single pushbutton assemblage 41.

Figure 8:
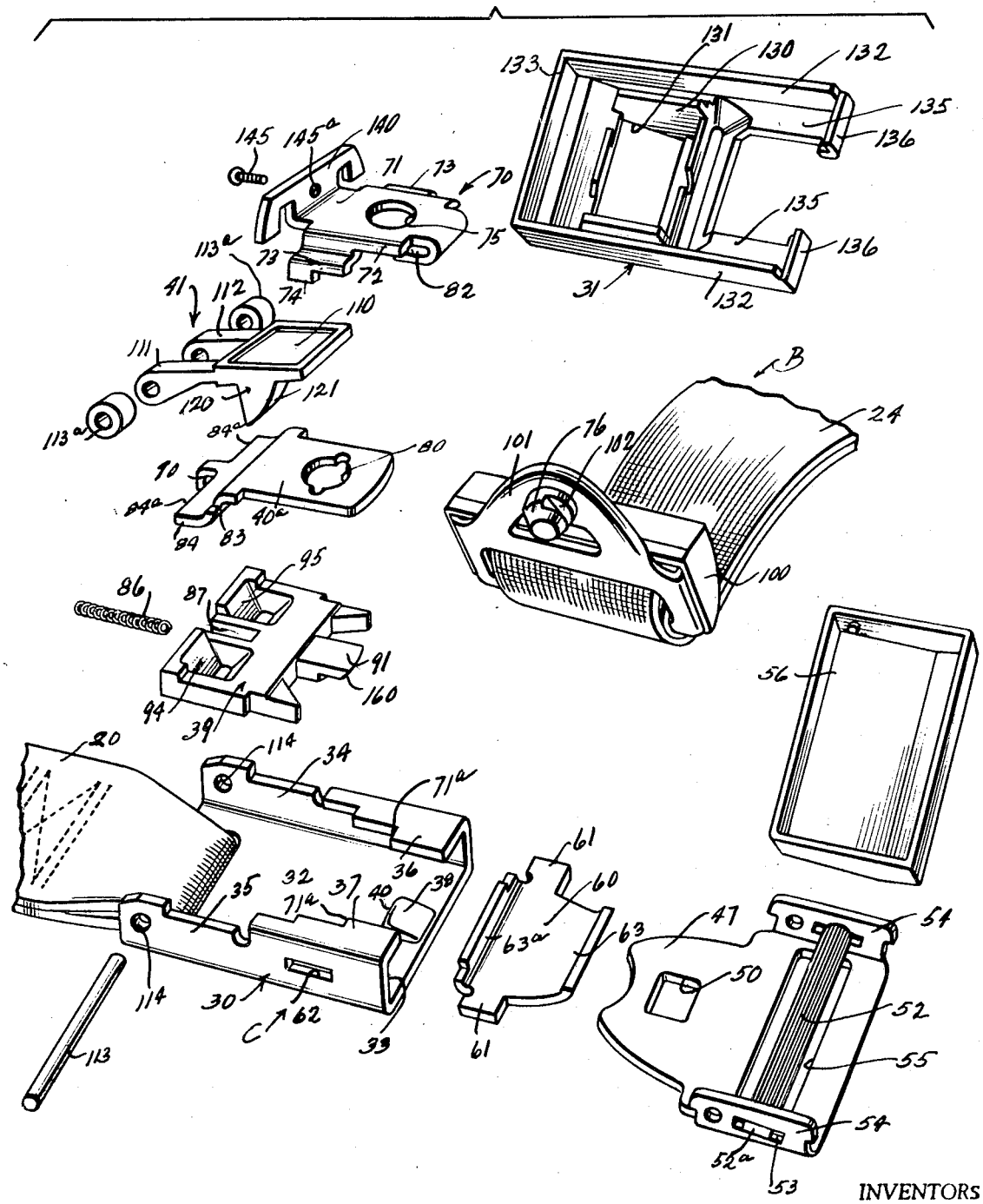
FIG. 8 is an exploded perspective view of the details of the improved buckle.

It will be noted from FIGS. 4 and 5 that the right lap strap 20 is a loop secured at 45 to the rear end of the base wall 32, extending through an opening 46. The other lap strap 21 is provided with a latching tongue 47 of usual construction, preferably flat, having an opening or socket 50 therein adapted to receive a stationary dog 38. The tongue 47, as shown in FIG. 8, is provided with a fluted latching bar 52 having ends 52$^a$ nonrotatably slidable in slots 53 in upstanding side flanges 54 of the tongue, as shown in FIG. 8 adapted to receive a removable cover 56. The strap 21 is adjustable, as to length and is looped through the base wall opening 55 around the bar 52; the double portion of the left web 21 being adjustable as to length in a manner well understood in the art. It makes little difference whether the right or left lap straps have this adjusting means.

A vertical force reaction plate 60 serves a multiple purpose within the buckle assemblage. It is provided with lateral extensions 61 adapted to be snugly seated within slots 62 located in the sidewalls 34 and 35 of the casing 30. It is nonmovable or stationary and of strong metal material having a forward end 63 upturned as shown in FIGS. 4 and 5. It may also have a rear upstanding curved camming extension 63$^a$ for the blocker 39. The extensions 61 hold the reaction plate 60 in firm position upon the casing and defines an entranceway 64 (see FIG. 5) in the casing for receiving the tongue 47 of the lap strap so that the latter may be guided into position over and against the stationary dog 38.

The casing construction of the buckle furthermore includes a top plate 70, shown in perspective in FIG. 8 which has a top wall 71, short depending sidewalls 72 which at the rear end of the plate are themselves provided with shorter horizontal lateral walls 73 and depending foot extensions 74 (see FIG. 8). This top wall is located upon the casing with its lateral walls 72 underlaying the top walls 36 and 37 of the casing 30, the depending feet 74 extending downwardly and resting upon the extensions 61 of the stationary reaction plate 60 (see FIG. 12). The depending sidewalls of the top plate are notched to seat at 71$^a$ in the casing walls 36 and 37. The top plate wall 71 at the fore ends of the casing walls 36 and 37 rests on the top of said walls 36 and 37. Wall 71 is provided with a central opening 75 adapted to receive a latching projection or lug 76 of the shoulder strap 24 in order that the same may cooperate with the slidable latching dog 40$^a$, as will be subsequently mentioned.

Referring to the slidable latching dog 40$^a$ adapted to releasably engage with the shoulder strap lug or projection 76, the same is slidably supported beneath the top wall 72 of the casing plate 70, as shown in FIGS. 4 and 5. It is provided with a latching opening 80 into which the belt projection 76 extends for latching engagement. The slidable dog 40$^a$ moves fore and aft and in its latching position projects across and below the opening 75 (See Fig. 9). The front end of 40$^a$ seats and is guided in a rearwardly opening socket 83 formed by downturning and rearturning of the wall 71. AT its rear end the latching dog 40$^a$ is downturned at 83 and then rearwardly flanged at 84. The rear edges of this flange 84 are intended to be cam engaged by the cam of pushbutton 41 to move the sliding dog 40$^a$ forwardly against a compressed biasing spring 86 (see FIG. 4) which is rearwardly socketed in a recess 87 of the "DELRIN" blocker 39 by a depending end 90 of the slidable dog rear bar 85. This spring normally urges the plastic blocker 39 forwardly to the position shown in FIG. 4 wherein its forward extension 91 overlies and holds the tongue 47 latched upon the dog projection 38. Spring 86 also normally urges the latching dog 40$^a$ rearwardly to its latching position.

Figure 6:
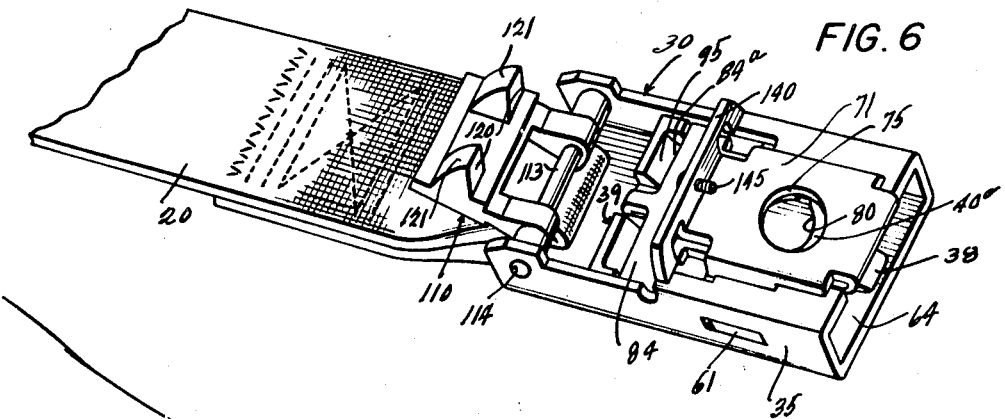
FIG. 6 is a perspective view of the casing construction of the buckle with its cover removed and the pushbutton turned back, showing the internal operating parts of the buckle.
Figure 7:
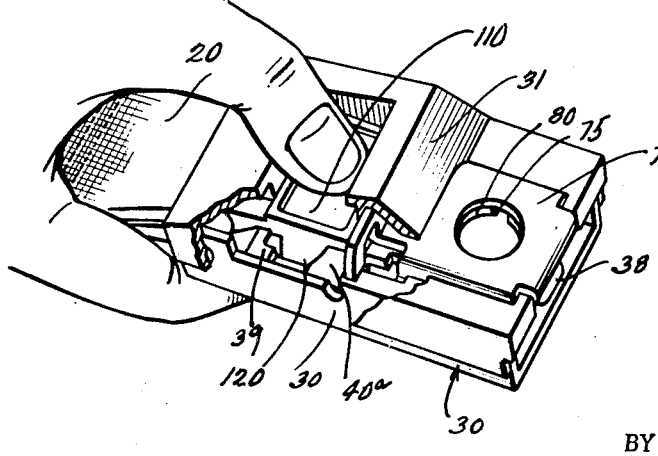
FIG. 7 is a fragmentary perspective view showing the buckle parts with the pushbutton actuated to release the detents.

It will be noted from the perspective view FIGS 6 and 8 that the rear end of the blocker 39 has depressions with downwardly and forwardly inclined surfaces 94 and 95.

It will be noted that the shoulder strap 24 is provided with a tongue 101 and an adjustable clamping box 100 similar to the latch strap box 56. The projection 76 is mounted on tongue 101. The projection or lug 76 is tapered and provide d with a lateral slot or socket 102 to receive the latching dog 40$^a$ therein for securement of the shoulder strap to the buckle construction.

The pushbutton means 41 for actuating the latching dog 40$^a$ and the blocker 39 to release positions, when depressed moves them in opposite directions to release the lap and shoulder straps. In the form of invention shown, a finger engaging push plate 110 is provided with rearwardly extending arms 111 and 112 transversely apertured to receive a mounting pin 113 the ends of which may be secured in apertures 114 of the casing sidewalls 34 and 35. Washers 113$^a$ may be used to center the pushbutton. The button plate pivots with a fore-and-aft movement and is depressible to provide sliding actions of the dog 40$^a$ and the blocker 39 in opposite directions.

The button 110 as will be noted from FIG. 6 is provided with camming or wedgelike members 120 in depending relation thereon and at the sides thereof. The fore surfaces 121 are arcuate, and adapted to engage the edges 84$^a$ of the latching plate 40$^a$. The wedges are rather peaked, in depending shape, and their lower ends are adapted to operate on the inclined surfaces 94 and 94 of the blocker plate 39 for the purpose of moving it rearwardly when the button is depressed as shown in FIG. 8 to remove the blocker extension 91 out of the path of the tongue 47 in order to permit release of the strap 21.

For purposes of light construction the cover 31 may be of thin plastic material. It includes a top wall 130 having a finger inserting opening 131 therein. It is provided with depending sidewalls 132, rear end walls 133 and forward extensions 135 having front depending walls 136. As shown in the drawings, the walls 132. 133, and 136 are intended to engage the upstanding walls of the casing 30 in frictional contact therewith.

It will be noted that the casing top plate 71 is provided with a metal crush bar 140 upon which the cover rests as shown in FIGS. 4 and 5 and to which a part of the cover may be secured by a screw 145 adjustable in a screw threaded opening 145$^a$.

From the foregoing it will be noted that the buckle construction is very compact, light in weight, very durable, and can be used for the purpose of securing safety lap straps and shoulder straps under the control of single depressible release pushbutton.

It will be noted from FIG. 4 that the latching or blocker extension 91 has a downwardly and rearwardly sloped face 160 which the tongue 47 may engage upon insertion to push the blocker 39 against the bias of spring 86 until the tongue socket snaps over the dog projection 38, and at which time the spring 86 will move the blocker forwardly into retaining position as shown in FIG. 4. FIG. 4 shows that the blocker 38 slidably engages against the vertical force reaction plate to hold the belt tongue 47 in latched position.

Figure 1:
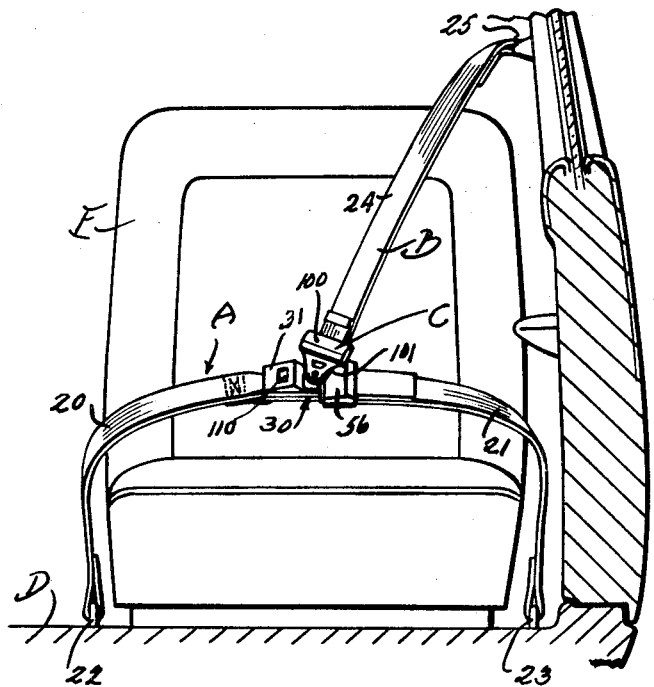
Figure 2:
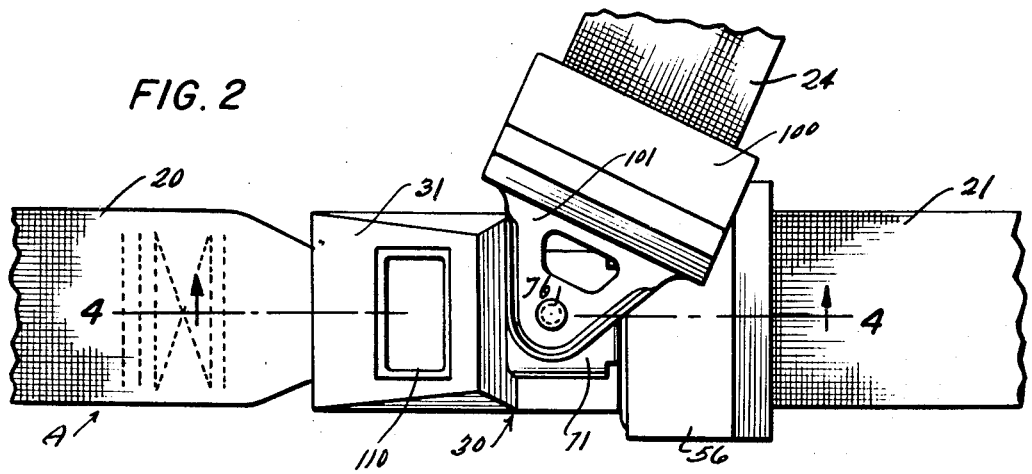
FIG. 2 is a fragmentary plan view of the lap webs and shoulder webs and an improved buckle means connecting them together.
Figure 3:
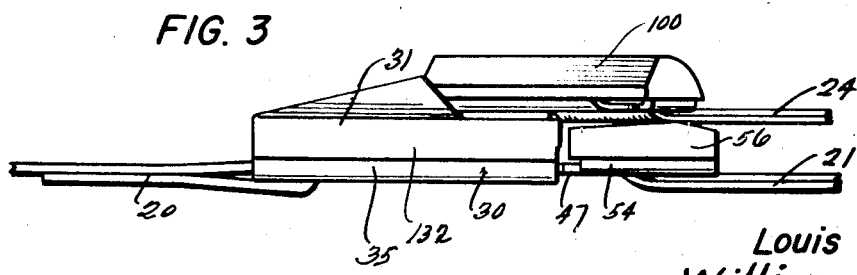
FIG. 3 is a side elevation of the parts shown in FIG. 2.

Referring to FIG. 14 the strap 20 remains as it is shown in the form of invention illustrated in FIG. 1. However, the shoulder strap 24$^a$ at its buckle end is provided with a tongue 101$^a$ permanently affixed thereto as by stitching. The outer end of the shoulder strap 24$^a$ is provided with a load bearing or self-locking retractor 25$^a$ which can be of the types shown in U.S. Pat. No. 3,325,212 or U.S. application Ser. No. 757,357, filed Sept. 4, 1968, although not to be limited thereto. The left lap strap 21$^a$ is provided with a fixedly attached tongue 47$^a$ at its buckle end and the opposite or outer end of the left lap strap may be connected to the car frame, by a load bearing or self-locking retractor 23$^a$ similar to the retractor 25$^a$ above described.

In the form of strap and buckle construction shown in FIG. 15 the lap straps have the same types of connections to the buckle as used in the form FIG. 14, but the shoulder strap 24$^b$ at its outer end has a fixed connection at 25$^b$ to the car frame, but its opposite end has the same type of adjustable strap and tongue construction as provided for the form of invention shown in FIG. 1, where the adjusting means 100 provided for tongue 101.

Referring to the tongue 101 above described the same is provided as mentioned with a projection or lug 76, the shape of which is very clearly shown in FIG. 8 as being provided with a transverse slot 102. This slot continues around the circumference of the projection 76 as shown in FIGS. 16 and 17 for less than 360 degrees. The projection at the ends of slot 102 has divergent cam edges 102$^a$ and 102$^b$ which close off the portion of the slot 102. These cam edges 102$^a$ and 102$^b$ when the locking tongue is in latched position are such that the opening 80 in the latching dog 40$^a$ enters the slot 102 and thereby latches the shoulder trap to the buckle. However, if it is desired to release the shoulder strap without disturbing the latched lap straps the wearer of the assembly turns the buckle end of the strap 24 through an angle such that one of the cam edges 102$^a$ and 102$^b$ rides against the opening 80 of the latching dog 40$^a$. This moves the latching dog 40$^a$ to release position as shown in FIG. 17 so that the strap 24 or 24$^a$ or 24$^b$, as the case may be, can be lifted out of its latched position and the wearer can then lean forward, even though the lap straps are attached as when the wearer desires to open the glove compartment or for any other reason.

Various changes in the size, shape and arrangement of parts may be made to the form of invention herein show and described without departing from the spirit of the invention or scope of the claims.

We claim:

1. In a safety belt construction, the combination of a casing having a chamber therein and a latching dog connected therewith within the chamber, a belt latching tongue having a socket adapted to releasably receive the dog for the latching of the tongue to the casing, a holding and blocking member movably carried by the casing for releasably holding the tongue latched to the dog, a second latching dog movably carried by the casing, a second belt attachable latching tongue having a means for releasable connection with the second dog, means normally moving the holding and blocking member and second dog is latched positions, and means movably carried by the casing for simultaneously operating said holding and blocking member and the movable latching dog into their respective tongue releasing and unlatched positions.

2. The buckle construction defined in claim 1 in which the last-mentioned means comprises a movable pushbutton member having a cam engageable with said holding and blocking member and the second movable latching dog to move them to their respective belt releasing positions.

3. The buckle construction defined in claim 2 in which a biasing spring is provided on the casing for normally moving both the movable holding means and the second dog in latching positions with respect to their respective tongues.

4. In a buckle adapted for use with vehicle safety seat belts, the combination of a casing having a chamber therein and a latching dog fixedly connected therein within the casing, a belt-attachable latching tongue having a socket adapted to releasably receive the dog for the latching of the dog to the casing, a holding member movably carried by the casing for releasably holding the tongue latched to the dog, a second dog movably carried by the casing, a second belt attachable latching tongue having a projection thereon provided with a lateral recess, said casing having an opening to receive said projection, said second dog having a portion to engage in the recess of the projection to hold the projection and its tongue attached to the casing, spring biasing means normally urging both the holding member and the second movable latching dog into their respective latching positions, and means movably carried by the casing to simultaneously urge the holding member and the movable latching dog to unlatched positions with respect to their tongues.

5. The buckle defined in claim 4 in which the last-mentioned means comprises a depressible pushbutton having cam means thereon for simultaneously engaging and moving the holding means and second latching dog against the force of the biasing spring to release positions.

6. In a safety belt buckle construction the combination of a strong casing including a base wall, upstanding relatively spaced sidewalls the upper ends of which are provided with overhanging flanges spaced from the base, a latching dog fixed on the casing base, a belt tongue having a socket for receiving said latching dog, a vertical force reaction plate mounted on the sidewalls of the casing in spaced relation from the inside surface of the base wall, a top plate mounted on the casing held in upward position thereon by said vertical force reaction plate and having an opening therein, a holding member slidably mounted on the base within the casing movable into and out of latching relation with respect to the base carried latching dog, a movable latching dog slidably mounted on the casing beneath the top plate having an opening therein adapted to align with the opening of the top plate, a belt receiving tongue having a projection thereon adapted for extension through the openings of the top plate and movable latching dog having a lateral recess into which the movable latching dog may engage to latch the tongue to said casing, spring biasing means normally urging both the holding means and movable latching dog to latching positions, and pushbutton means depressibly mounted on the casing for actuating said holding means and movable latching dog for the purpose of releasing the holding means and movable latching dog from their latching positions.

7. The buckle of claim 6 in which the holding means and pushbutton have cams which normally moves the holding means and movable latching dog to unlatched positions upon depression of the push button.

8. In a safety belt construction the combination of a buckle having a casing provided with a chamber therein, a latching dog movable in the casing chamber, a belt having a tongue provided with a transverse projection thereon which has a lateral latching recess transversely to the axis of said projection adapted to receive the movable latching dog to latch the buckle casing to the tongue, means on the casing to release the latching dog from latching relation with the tongue, and cam means on the projection engageable with said latching dog upon predetermined rotary movement of the projection with respect to the latching dog to move the latching dog to a releasing position with respect to said projection.

9. A safety belt construction as defined in claim 8 in which the cam means comprises a portion of the projection extending across the lateral recess around part of the circumference of said recess whereby upon turning the projection with respect to the latching dog said cam means will engage and move the dog to a releasing position with respect to said projection and its tongue.

10. In a safety belt construction the combination of a buckle having a casing provided with a chamber therein, a latching dog movable in the casing chamber, a shoulder belt having a tongue provided with a transverse projection thereon which has a lateral latching recess transversely to the axis of said projection adapted to receive the movable latching dog to latch the buckle casing to the tongue means on the casing to release the latching dog from latching relation with the tongue, cam means on the projection engageable with said latching dog upon predetermined rotary movement of the projection with respect to the latching dog to move the latching dog to a releasing position, a lap strap means including a tongue, the buckle casing having an opening therein for receiving the lap strap tongue, a second movable latching dog carried by the buckle casing for releasably receiving the lap tongue, and means to simultaneously release both the shoulder latching dogs and lap strap latching dog simultaneously.

11. The safety belt construction as defined in claim 10 in which the cam means comprises a portion of the projection extending across the lateral recess around part of the circumference of said recess whereby upon turning the projection with respect to the latching dog said cam means will engage and move the dog to a releasing position with respect to said projection and its tongue.

12. In a safety belt construction the combination of a buckle casing, a belt tongue, latching means on the tongue and in the casing for releasably latching the tongue to the casing including a slidable member carried by the casing, a second latching dog movably carried by the casing for slidable movement in parallelism with the said slidable member, a second belt tongue having means thereon for releasable connection with the second latching dog, and means for simultaneously moving said first-mentioned slidable member and the second-mentioned latching dog within the casing in opposite directions for releasing their respective belt tongues.